United States Patent Office 3,288,885
Patented Nov. 29, 1966

3,288,885
COMPOSITION FOR STABILIZING POLYACETALS COMPRISING (1) N-ACYL-p-AMINOPHENOL, (2) A SUPERPOLYAMIDE, AND (3) A DIESTER OF A THIODIALKANOIC ACID
Richard Green, Livingston, and Roy T. Gottesman, Glen Rock, N.J., assignors, by mesne assignments, to Tenneco Chemicals, Inc., a corporation of Delaware
No Drawing. Filed Apr. 4, 1963, Ser. No. 270,565
9 Claims. (Cl. 260—857)

This invention relates to the stabilization of polyacetals and, more particularly, to the stabilization of high molecular weight polymers of formaldehyde. The invention provides an improved thermally stable polyacetal composition and is based upon the discovery that certain N-acyl-p-aminophenols, when incorporated into a high molecular weight polymer of formaldehyde, particularly in conjunction with other stabilizers, are remarkably effective for improving the thermal stability of the formaldehyde polymer.

Recent advances in polymer process technology have made commercially available the high molecular weight polymers of formaldehyde. These polyacetals, which include both the homopolymers and copolymers of formaldehyde, are thermoplastic resins which, upon stabilization, may be fabricated into films, filaments, fibers, rods and tubes. Because of the inherent instability of unstabilized polyacetals (such as polyoxymethylene glycol) to oxidative or hydrolytic cleavage of the polymer chains or to thermal degradation, generally the raw "uncapped" polymers require stabilization, either by the further reaction of an "uncapped" polymer by acylation, etherification, cyanoethylation, or cross-linking to block the "uncapped" hydroxy groups, by controlled degradation of the polymer chain until an end-group is reached which is inert to further chemical or physical degradation, by the incorporation in the polymer composition of a stabilizer systems which promote the stabilization of the polymer composition of a stabilizer or stabilizer systems which promote the stabilization of the polymer against oxidative, hydrolytic or thermal degradation, or by employing a combination of these techniques.

Using a large number of high molecular weight polymers of formaldehyde, including both linear and branched-chain homopolymers and copolymers as well as the "capped" and "uncapped" analogs of these polymers, we have found in all instances that the incorporation (or admixture) in the formaldehyde polymer of a ternary stabilizer system comprising (i) an N-acyl-p-aminophenol, (ii) a superpolyamide, and (iii) a diester of a thiodialkanoic acid, is remarkably effective for improving the thermal stability of the formaldehyde polymer. Moreover, this ternary stabilizer system apparently may be used to stabilize any polyacetal composition containing a high molecular weight polymer of formaldehyde.

As used herein, the term "high molecular weight polymer of formaldehyde" includes both linear and branched-chain homopolymers and copolymers of formaldehyde having a molecular weight in the range from about 10,000 to about 200,000 and a melting point in excess of 170° C., the predominant structural feature of both homopolymers and copolymers being the recurring oxymethylene units (—OCH$_2$—) in the polymer chain. Among the most important homopolymers are $\alpha,\omega$-polyoxymethylene glycol, $\alpha,\omega$-polyoxymethylene dicarboxylates (such as the diacetate or dipropionate), and $\alpha,\omega$-polyoxymethylene diethers (such as the methyl, ethyl, or $\beta$-hydroxyethyl ethers), all of which may have $\omega$-substituted-polyoxymethylene branched chains at one or more points in the main polymer chain. The formaldehyde copolymers include both linear and branched-chain polymers in which the recurring oxymethylene units (—OCH$_2$—) in the polymer chains are periodically or randomly interrupted by other oxyalkylene units containing two or more vicinal carbon atoms, or by other units introduced by copolymerizing other monomers, such as $\gamma$-butyrolactone, phthalide or isocyanic acid, with substantially anhydrous formaldehyde or with its trimer, trioxane.

The ternary stabilized system which is incorporated in the high molecular weight polymer of formaldehyde in accordance with the invention comprises three essential components, namely (i) an N-acyl-p-aminophenol, (ii) a superpolyamide, and (iii) a diester of a thiodialkanoic acid. The N-acyl-p-aminophenols are those in which the acyl group contains from 2 to 20 carbon atoms and, preferably, from 4 to 18 carbon atoms. Among the N-acyl-p-aminophenols which have been successfully used in the stabilizer system are N-acetyl-p-aminophenol, N-butyroyl-p-aminophenol, N-pelargonoyl-p-aminophenol, N-lauroyl-p-aminophenol, and N-stearoyl-p-aminophenol. Only very small amounts of the N-acyl-p-aminophenol are required in the stabilizer system, and in general concentrations in the range from about 0.001 to about 10 percent by weight, based on the weight of the formaldehyde polymer, have been found effective. There is no particular advantage in using more than about 1 percent by weight, and in most instances concentrations in the range from about 0.01 to about 1 percent by weight, based on the weight of the formaldehyde polymer, are sufficiently effective to stabilize most formaldehyde polymers.

The superpolyamides employed in the ternary stabilizer system are those which are formed upon the polymerization of mixtures of dicarboxylic acids and diamines, or upon the polymerization of $\omega$-aminomonocarboxylic acids, and which have a degree of polymerization in the range between about 100 to about 200. These superpolyamides, which are generically called "nylons," preferably should have melting points below about 220° C. Among the superpolyamides that may be used in the ternary stabilizer system to stabilize high molecular weight formaldehyde polymers in accordance with the invention are the condensation products of the following diamines and dicarboxylic acids:

pentamethylenediamine/malonic acid,
pentamethylenediamine/pimelic acid,
hexamethylenediamine/adipic acid,
hexamethylenediamine/sebacic acid,
N,N'-hydroxymethylhexamethylenediamine/adipic acid,
N,N'-methoxymethylhexamethylenediamine/adipic acid,
octamethylenediamine/suberic acid,
1,1,6,6-tetramethylenehexamethylenediamine/sebacic acid,
decamethylenediamine/sebacic acid,
dodecanemethylenediamine/2,2,5,5-tetramethyladipic acid, and
2,5-dimethylpiperazine/glutaric acid.

Moreover, the ternary stabilizer system may also contain superpolyamides which are the self-condensation polymers derived, for example, from 6-aminocaproic acid, 9-aminononanoic acid, 11-aminoundecanoic acid, or their lactams, as well as superpolyamides which are copolymers or terpolymers. Although the superpolyamide may be used over a wide range of concentrations, generally in the range from about 0.01 to about 50 percent by weight (based on the weight of the formaldehyde polymer), we have obtained particularly satisfactory results using ternary stabilizer systems which contain the superpolyamide in concentrations equivalent to from about 0.05 to about 3 percent by weight, based on the weight of the formaldehyde polymer.

The third essential component in the ternary stabilizer system is a diester of a thiodialkanoic acid. Structurally, these diesters are represented by the formula

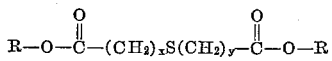

in which R is a radical selected from the group consisting of alkyl groups having from 8 to 20 carbon atoms, hydroxyalkyl groups having from 1 to 4 carbon atoms, cycloalkyl groups, and polyoxyalkyl groups, and $x$ and $y$ each represent an integer from 1 to 3. Diesters which may be used in the ternary stabilizer system include, by way of illustration, dioctyl 2,2'-thiodiacetate, dilauryl 2,2'-thiodiacetate, dioctyl 3,3'-thiodipropionate, didecyl 3,3'-thiodipropionate, dicetyl 3,3'-thiodipropionate, distearyl 3,3'-thiodipropinoate, dieicosyl 3,3'-thiodipropionate, lauryl stearyl 3,3'-thiodipropionate, dicyclohexyl 3,3'-thiodipropionate, di(4-ethylcyclohexyl) 3,3'-thiodipropionate, di-(hydroxymethyl)3,3'-thiodipropionate, di-(hydroxybutyl) 3,3'-thiodipropionate, di(polyethylene glycol) 3,3'-thiodipropionate, dilauryl 4,4'-thiodibutyrate; dicyclohexyl 4,4'-thiodibutyrate, and di-(hydroxyethyl) 4,4'-thiodibutyrate, the preferred diesters being those in which R represents an alkyl group having from 12 to 18 carbon atoms, and $x$ and $y$ are 2. The amount of the thiodialkanoic acid diester used in the ternary stabilizer system need only be equivalent to from about 0.0001 to about 1 percent by weight, and in most instances to from about 0.001 to about 0.8 percent by weight, based on the weight of the formaldehyde polymer, since the thiodialkanoic acid diester appears in some way to enhance the effectiveness of the other additives in the stabilizer system.

Although the optimum concentration ranges which are described above for each of the three essential componetnts of the stabilizer system have been found to be effective for enhancing the thermal stability of those high molecular weight polymers of formaldehyde which were tested, it should be realized that the actual amount of each stabilizer used in the stabilizer system is dependent, to a large extent, upon the structure and chemical composition of the formaldehyde polymer. For example, if the formaldehyde polymer also has been chemically stabilized, such as by acylation, etherification or cross-linking to block the "uncapped" hydroxy groups, then a lower concentration of the stabilizer system may be used. Notwithstanding the degree of chemical stabilization in the formaldehyde polymer, however, by using these ternary stabilizer systems, that is, systems which contain at least one of each of the three essential components, in high molecular weight polymers of formaldehyde, it is possible to improved the thermal stability of the resultant polyacetal composition.

Accordingly, the invention provides an improved thermally stable polyacetal composition comprising a high molecular weight polymer of formaldehyde having a molecular weight in the range from about 10,000 to about 200,000 and a melting point in excess of 170° C. and containing a stabilizer system comprising (i) from about 0.001 to about 10 percent by weight of an N-acyl-p-aminophenol in which the acyl group contains from 2 to 20 carbon atoms, (ii) from about 0.01 to about 50 percent by weight of a superpolyamide formed upon the polymerization of monomeric compounds selected from the group consisting of (1) mixtures of dicarboxylic acids and diamines, and (2) ω-aminomonocarboxylic acids, and having a degree of polymerization in the range between about 100 to about 200, and (iii) from about 0.0001 to about 1 percent by weight of a diester of a thiodialkanoic acid having a structure represented of the formula

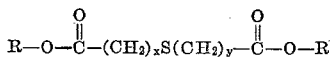

in which R is a radical selected from the group consisting of alkyl groups having from 8 to 20 carbon atoms, hydroxyalkyl groups having from 1 to 4 carbon atoms, cycloalkyl groups, and polyoxyalkyl groups, and $x$ and $y$ each represent an integer from 1 to 3, all percentages being based on the weight of the formaldehyde polymer in the polyacetal composition.

The stabilizers may be incorporated in the polyacetal compositions of the invention by any convenient procedure, one method for which involves dissolving the stabilizer components in a volatile solvent, such as a ketone, lower alkanol, or chlorinated hydrocarbon, adding to the formaldehyde polymer such amounts of these solutions (or a single solution of all three components) which are sufficient to provide the desired amounts of the stabilizer components in the polyacetal composition, and removing the solvent by evaporation. Alternatively, the stabilized by polyacetal compositions of the invention can be prepared by milling the stabilizer components together with the formaldehyde polymer, or by dissolving both the stabilizer components and the formaldehyde polymer in a common solvent and then removing the solvent by evaporation.

The following examples are illustrative of the effectiveness with which a ternary stabilizer system comprising an N-acyl-p-aminophenol, a superpolyamide, and a diester of a thiodialkanoic acid, may be incorporated into high molecular weight polymers of formaldehyde to prepare the thermally stable polyacetal compositions of the invention:

Example 1

A series of stabilized polyacetal compositions was prepared by the following procedure: To one part by weight of polyoxymethylene diacetate (the term "polyoxymethylene diacetate" being used to define an acetylated homopolymer of formaldehyde, which may have been branched and hence contained more than two acetate groups per molecule), having an average molecular weight of about 30,000, as determined by viscometric techniques, was added (i) 0.3 part by weight of a 1 percent solution in acetone of one of four N-acyl-p-aminophenols, (ii) 1.5 parts by weight of a 1 percent solution in acetone of a superpolyamide which was a terpolymer of approximately 38% polycaprolactam/35% polyhexamethylene adipamide/27% polyhexamethylene sebacamide, and (iii) 0.1 part by weight of a 1 percent solution in acetone of dilauryl 3,3'-thiodipropionate. Each of the resulting polyacetal compositions were air-dried to remove the acetone, and the thermal stability rating of each composition determined by measuring the weight loss that the stabilized polyacetal compositions underwent on heating in an oxidizing atmosphere for 30 minutes at 222° C. as well as the weight loss of the unstabilized polyoxymethylene diacetate when it was subjected to the same heat treatment. The thermal stability rating for each composition was then calculated using the following formula:

$$S_T = \left(\frac{W_U - W_S}{W_U}\right) \times 100$$

where $S_T$ = thermal stability rating (percent);
$W_U$ = weight loss of the unstabilized polyoxymethylene diacetate; and
$W_S$ = weight loss of the stabilized polyacetal composition.

The results of each of these tests are summarized below in Table I.

TABLE I.—THERMAL STABILITY RATINGS OF POLYOXYMETHYLENE DIACETATE COMPOSITIONS

| Example | N-acyl-p-aminophenol | Thermal Stability Rating (Percent) |
|---|---|---|
| 1A | N-butyroyl-p-aminophenol | 96.9 |
| 1B | N-pelargonoyl-p-aminophenol | 98.3 |
| 1C | N-lauroyl-p-aminophenol | 98.0 |
| 1D | N-stearoyl-p-aminophenol | 95.6 |

In theory, a stabilizer which gives complete protection to the polyoxymethylene diacetate under the conditions of the test will have a thermal stability rating of 100 percent. For most commercial purposes, the polyoxymethylene diacetate compositions should have a thermal stability rating of at least 90 percent, and preferably at least 95 percent.

and the percent weight loss determined. The results of these tests are summarized below in Table III.

TABLE III.—THERMAL STABILITY OF POLYACETAL COMPOSITIONS

| Example | Polyformaldehyde | | N-acyl-p-aminophenol | Percent Loss in Weight |
|---|---|---|---|---|
| | Mol. Weight | Percent Loss in Weight of Unstabilized Polymer | | |
| 3A | 42,000 | 6.87 | N-butyroyl-p-aminophenol | 0.64 |
| 3B | 42,000 | 6.87 | N-pelargonoyl-p-aminophenol | 0.28 |
| 3C | 42,000 | 6.87 | N-lauroyl-p-aminophenol | 0.09 |
| 3D | 42,000 | 6.87 | N-stearoyl-p-aminophenol | 0.67 |
| 3E | 53,000 | 12.20 | N-butyroyl-p-aminophenol | 0.06 |
| 3F | 53,000 | 12.20 | N-pelargonoyl-p-aminophenol | 0.27 |
| 3G | 53,000 | 12.20 | N-lauroyl-p-aminophenol | 0.03 |
| 3H | 53,000 | 12.20 | N-stearoyl-p-aminophenol | 0.09 |
| 3I | 37,000 | 23.86 | N-butyroyl-p-aminophenol | 0.03 |
| 3J | 37,000 | 23.86 | N-pelargonoyl-p-aminophenol | 0.12 |
| 3K | 37,000 | 23.86 | N-lauroyl-p-aminophenol | 0.02 |
| 3L | 37,000 | 23.86 | N-stearoyl-p-aminophenol | 0.04 |
| 3M | 36,000 | 19.15 | N-butyroyl-p-aminophenol | 0.45 |
| 3N | 36,000 | 19.15 | N-pelargonoyl-p-aminophenol | 0.31 |
| 3O | 36,000 | 19.15 | N-lauroyl-p-aminophenol | 0.13 |
| 3P | 36,000 | 19.15 | N-stearoyl-p-aminophenol | 0.18 |

Example II

A series of stabilized polyacetal compositions which contained as stabilizers (i) 1.5 percent by weight of a superpolyamide which was a terpolymer of approximately 38% polycaprolactam/35% polyhexamethylene adipamide/27% polyhexamethylene sebacamide, (ii) 0.3 percent by weight of one of four N-acyl-p-aminophenol, and (iii) 0.1 percent by weight of dilauryl thiodipropionate was prepared by the procedure described in Example I. The polyacetal compositions were heated in an oxidating atmosphere at 222° C. for 30 minutes, and the percent weight loss of each of these compositions determined during the heating period. For comparative purposes, an unstabilized polyoxymethylene diacetate composition and a polyoxymethylene diacetate composition containing 2 percent by weight of p-aminophenol were similarly tested. The results of these tests are set forth in Table II.

TABLE II.—THERMAL STABILITY OF POLYOXYMETHYLENE DIACETATE COMPOSITIONS

| Example | N-acyl-p-aminophenol | Percent Loss in Weight |
|---|---|---|
| 2A | N-butyroyl-p-aminophenol | 0.72 |
| 2B | N-pelargonoyl-p-aminophenol | 0.43 |
| 2C | N-lauroyl-p-aminophenol | 0.45 |
| 2D | N-stearoyl-p-aminophenol | 1.36 |
| 2E | p-Aminophenol [1] | 17.2 |
| 2F | None | 22.6 |

[1] 2% based on polyoxymethylene.

Example III

A series of sixteen polyacetal compositions was prepared which contained as stabilizer (i) 1.5 percent by weight of a superpolyamide which is a terpolymer of approximately 38% polycaprolactam/35% polyhexamethylene adipamide/27% polyhexamethylene sebacamide, (ii) 0.3 percent by weight of a particular n-acyl-p-aminophenol, and (iii) 0.1 percent by weight of dilauryl thiodipropionate. The formaldehyde polymers used in the preparation of these polyacetal compositions had average molecular weights between 36,000 and 53,000 and inherent thermal stabilities ($S_T$) between 6.87 percent and 23.86 percent. Each polyacetal composition was heated in an oxidizing atmosphere at 222° C. for 30 minutes,

Example IV

To compare the relatively stabilizing effect exerted on a polyacetal composition when either the N-acyl-p-aminophenol, superpolyamide, or thiodialkanoic acid diester was separately employed to stabilize the formaldehyde polymer, a series of polyoxymethylene diacetate compositions which contained as the sole stabilizer either 2 percent by weight of a superpolyamide, 2 percent by weight of an N-acyl-p-aminophenol, or 2 percent by weight of dilauryl 3,3'-thiodipropionate was prepared by the procedure described in Example I. As before, each polyacetal composition was heated to a temperature of 222° C. for a period of 30 minutes, and its thermal stability rating ($S_T$) determined by the formula defined in Example I. The results of these tests are summarized below in Table IV.

TABLE IV.—THERMAL STABILITY RATINGS OF POLYOXYMETHYLENE DIACETATE COMPOSITIONS CONTAINING A SINGLE STABILIZER

| Example | Stabilizer | Thermal Stability Rating (Percent) |
|---|---|---|
| 4A | N-butyroyl-p-aminophenol | 84.0 |
| 4B | N-pelargonoyl-p-aminophenol | 89.8 |
| 4C | N-lauroyl-p-aminophenol | 89.0 |
| 4D | N-stearoyl-p-aminophenol | 92.0 |
| 4E | Terpolymer of 38% polycaprolactam/35% polyhexamethylene adipamide/27% polyhexamethylene sebacamide. | 67.0 |
| 4F | Dilauryl 3,3'-thiodipropionate | 48.5 |

Comparison of the data set forth in Table IV with that summarized in Table I shows that in every instance the polyacetal compositions which contained the ternary stabilizer system were much more resistant to thermal degradation than the corresponding polyacetal compositions which contained only one of the aforementioned stabilizer components.

We claim:

1. A thermally stable polyacetal composition comprising a high molecular weight polymer of formaldehyde having a molecular weight in the range from about 10,000 to about 200,000 and a melting point in excess of 170° C. and containing a stabilizer system comprising (i) from about 0.001 to about 10 percent by weight of an N-acyl-p-aminophenol in which the acyl group contains from 2 to 20 carbon atoms, (ii) from about 0.01 to about 50 percent by weight of a superpolyamide formed upon the polymerization of monomeric compounds selected from the group consisting of mixtures of dicarboxylic acids and diamines, and ω-aminomonocarboxylic acids, and having a degree of polymerization in the range between about 100 to about 200, and (iii) from about 0.0001 to about 1 percent by weight of a diester of a thiodialkanoic acid having a structure represented by the formula

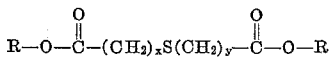

in which R is a radical selected from the group consisting of alkyl groups having from 8 to 20 carbon atoms, hydroxyalkyl groups having from 1 to 4 carbon atoms, cycloalkyl groups, and polyoxyalkyl groups, and $x$ and $y$ each represent an integer from 1 to 3, all percentages being based on the weight of the formaldehyde polymer in the polyacetal composition.

2. A thermally stable polyacetal composition comprising a high molecular weight polymer of formaldehyde having a molecular weight in the range from about 15,000 to about 100,000 and a melting point in excess of 170° C. and containing a stabilizer system comprising (i) from about 0.01 to about 1 percent by weight of an N-acyl-p-aminophenol in which the acyl group contains from 2 to 20 carbon atoms, (ii) from about 0.05 to about 3 percent by weight of a superpolyamide formed upon the polymerization of monomeric compounds selected from the group consisting of mixtures of dicarboxylic acids and diamines, and ω-aminomonocarboxylic acids, and having a degree of polymerization in the range between about 100 to about 200, and (iii) from about 0.001 to about 0.8 percent by weight of a diester of a thiodialkanoic acid having a structure represented by the formula

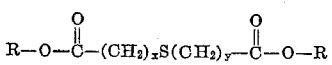

in which R is a radical selected from the group consisting of alkyl groups having from 8 to 20 carbon atoms, hydroxyalkyl groups having from 1 to 4 carbon atoms, cycloalkyl groups, and polyoxyalkyl groups, and $x$ and $y$ each represent an integer from 1 to 3, all percentages being based of the weight of the formaldehyde polymer in the polyacetal composition.

3. A thermally stable polyacetal composition comprising a high molecular weight polymer of formaldehyde having a molecular weight in the range from about 20,000 to about 100,000 and a melting point in excess of 170° C. and containing a stabilizer system comprising (i) from about 0.1 to about 1 percent by weight of an N-acyl-p-aminophenol in which the acyl group contains from 4 to 18 carbon atoms, (ii) from about 0.05 to about 3 percent by weight of a superpolyamide formed upon the polymerization of monomeric compounds selected from the group consisting of mixtures of dicarboxylic acids and diamines, and ω-aminomonocarboxylic acids, and having a degree of polymerization in the range between about 100 to about 200, and (iii) from about 0.001 to about 0.8 percent by weight of a diester of a thiodialkanoic acid having a structure represented by the formula

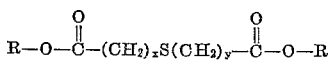

in which R is a radical selected from the group consisting of alkyl groups having from 8 to 20 carbon atoms, hydroxyalkyl groups having from 1 to 4 carbon atoms, cycloalkyl groups and polyoxyalkyl groups, and $x$ and $y$ each represent an integer from 1 to 3, all percentages being based on the weight of the formaldehyde polymer in the polyacetal composition.

4. A polyacetal composition according to claim 3, in which the N-acyl-p-aminophenol is N-butyroyl-p-aminophenol.

5. A polyacetal composition according to claim 3, in which the N-acyl-p-aminophenol is N-pelargonoyl-p-aminophenol.

6. A polyacetal composition according to claim 3, in which the N-acyl-p-aminophenol is N-lauroyl-p-aminophenol.

7. A polyacetal composition according to claim 3, in which the N-acyl-p-aminophenol is N-stearoyl-p-aminophenol.

8. A thermally stable polyacetal composition comprising a high molecular weight polymer of formaldehyde having a molecular weight in the range from about 15,000 to about 100,000 and a melting point in excess of 170° C. and containing a stabilizer system comprising (i) from about 0.01 to about 1 percent by weight of an N-acyl-p-aminophenol in which the acyl group contains from 2 to 20 carbon atoms, (ii) from about 0.05 to about 3 percent by weight of a superpolyamide terpolymer having a degree of polymerization in the range from about 100 to about 200 and containing about 38 percent by weight of polycaprolactam, about 35 percent by weight of polyhexamethylene adipamide, and about 27 percent by weight of polyhexamethylene sebacamide, and (iii) from about 0.001 to about 0.8 percent by weight of a diester of a thiodialkanoic acid having a structure represented by the formula

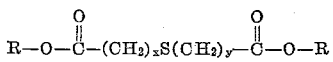

in which R is a radical selected from the group consisting of alkyl groups having from 8 to 20 carbon atoms, hydroxyalkyl groups having from 1 to 4 carbon atoms, cycloalkyl groups, and polyoxyalkyl groups, and $x$ and $y$ each represent an integer from 1 to 3, all percentages except that identifying the composition of the superpolyamide terpolymer being based on the weight of the formaldehyde polymer in the polyacetal composition.

9. A thermally stable polyacetal composition comprising a high molecular weight polymer of formaldehyde having a molecular weight in the range from about 15,000 to about 100,000 and a melting point in excess of 170° C. and containing a stabilizer system comprising (i) from about 0.01 to about 1 percent by weight of an N-acyl-p-aminophenol in which the acyl group contains from 2 to 20 carbon atoms, (ii) from about 0.05 to about 3 percent by weight of a superpolyamide formed upon the polymerization of monomeric compounds selected from the group consisting of mixtures of dicarboxylic acids and diamines, and ω-aminomonocarboxylic acid, and having a degree of polymerization in the range between about 100 to about 200, and (iii) from about 0.001 to about 0.8 percent by weight of dilauryl thiodipropionate, all percentages being based on the weight of the formaldehyde polymer in the polyacetal composition.

References Cited by the Examiner

UNITED STATES PATENTS 2,993,025  7/1961  Alsup et al. _____ 260—857
3,072,604  1/1963  Tholstrup _____ 260—45.85

FOREIGN PATENTS 1,117,868  11/1961  Germany.

MURRAY TILLMAN, *Primary Examiner.*

J. C. BLEUTGE, *Assistant Examiner.*